US011900647B2

(12) United States Patent
Jie et al.

(10) Patent No.: US 11,900,647 B2
(45) Date of Patent: Feb. 13, 2024

(54) IMAGE CLASSIFICATION METHOD, APPARATUS, AND DEVICE, STORAGE MEDIUM, AND MEDICAL ELECTRONIC DEVICE (71) Applicant: TENCENT TECHNOLOGY (SHENZHEN) COMPANY LIMITED, Shenzhen (CN)

(72) Inventors: Zequn Jie, Shenzhen (CN); Bo Zhao, Shenzhen (CN); Jiashi Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 365 days.

(21) Appl. No.: 17/459,920

(22) Filed: Aug. 27, 2021

(65) Prior Publication Data
US 2021/0390695 A1 Dec. 16, 2021

Related U.S. Application Data (63) Continuation of application No. PCT/CN2020/098407, filed on Jun. 28, 2020.

(30) Foreign Application Priority Data

Jun. 28, 2019 (CN) .......................... 201910573560.9

(51) Int. Cl.
*G06V 10/44* (2022.01)
*G06N 3/08* (2023.01)
(Continued)

(52) U.S. Cl.
CPC ........ G06V 10/454 (2022.01); G06F 18/2415 (2023.01); G06N 3/045 (2023.01);
(Continued)

(58) Field of Classification Search
CPC .... G06V 10/454; G06V 10/806; G06V 10/82; G06F 18/2415; G06N 3/045; G06N 3/08;
(Continued)

(56) References Cited

U.S. PATENT DOCUMENTS 6,778,705 B2 * 8/2004 Gutta .................. G06F 18/2414
382/190
8,498,491 B1 * 7/2013 Steffens ............... G06V 40/172
382/224
(Continued)

FOREIGN PATENT DOCUMENTS

CN 106650550 A 5/2017
CN 109146848 A 1/2019
(Continued)

OTHER PUBLICATIONS

Lau et al., 2000, "The Influences of Image Classification By Fusion of Spatially Oriented Images" (pp. 752-759). (Year: 2000).*
(Continued)

*Primary Examiner* — Manav Seth
(74) *Attorney, Agent, or Firm* — ANOVA LAW GROUP PLLC (57) ABSTRACT An image classification method is provided to an electronic device. The method includes: receiving a target image and a reference image about the target image, the target image being a medical image; determining a first image feature of the target image and a second image feature of the reference image; fusing the first image feature and the second image feature to determine a to-be-classified image feature; and determining, by using the to-be-classified image feature, a probability that the target image belongs to a preset category.

20 Claims, 5 Drawing Sheets (51) Int. Cl.
*G06T 3/40* (2006.01)
*G06T 7/00* (2017.01)
*G06F 18/2415* (2023.01)
*G06N 3/045* (2023.01)
*G06V 10/80* (2022.01)
*G06V 10/82* (2022.01)

(52) U.S. Cl.
CPC .............. *G06N 3/08* (2013.01); *G06T 3/4038* (2013.01); *G06T 7/0012* (2013.01); *G06V 10/806* (2022.01); *G06V 10/82* (2022.01); *G06T 2207/20081* (2013.01); *G06T 2207/20084* (2013.01); *G06T 2207/20221* (2013.01); *G06T 2207/30068* (2013.01)

(58) Field of Classification Search
CPC ................. G06T 3/4038; G06T 7/0012; G06T 2207/20081; G06T 2207/20084; G06T 2207/20221; G06T 2207/30068
See application file for complete search history.

(56) References Cited

U.S. PATENT DOCUMENTS

| | | | | |
|---|---|---|---|---|
| 9,977,997 | B2* | 5/2018 | Bai | G06V 10/32 |
| 11,461,639 | B2* | 10/2022 | Liu | G06N 3/04 |
| 11,776,129 | B2* | 10/2023 | Mequanint | G06V 10/82 382/173 |
| 11,783,491 | B2* | 10/2023 | Tang | G06T 7/251 382/103 |
| 2002/0067857 | A1 | 6/2002 | Hartmann et al. | |
| 2016/0253466 | A1 | 9/2016 | Agaian et al. | |
| 2017/0270653 | A1 | 9/2017 | Garnavi et al. | |
| 2019/0034734 | A1* | 1/2019 | Yen | G06F 18/2413 |
| 2019/0130188 | A1* | 5/2019 | Zhou | G06T 7/248 |
| 2019/0130191 | A1* | 5/2019 | Zhou | G06V 20/52 |
| 2020/0293840 | A1* | 9/2020 | Kang | G06F 18/23 |
| 2021/0406596 | A1* | 12/2021 | Hoffman | G06V 10/82 |
| 2023/0139927 | A1* | 5/2023 | Singh | G06V 10/82 382/157 |
| 2023/0279046 | A1* | 9/2023 | Xiao | B01D 15/34 530/417 |

FOREIGN PATENT DOCUMENTS

| | | |
|---|---|---|
| CN | 109447065 A | 3/2019 |
| CN | 110276411 A | 9/2019 |
| CN | 110321920 A | 10/2019 |
| JP | 2012174178 A | 9/2012 |
| JP | 2019028887 A | 2/2019 |
| WO | 2019015246 A1 | 1/2019 |

OTHER PUBLICATIONS

Rokni et al., 2014, "A new approach for surface water change detection: Integration of pixel level image fusion and image classification techniques" (pp. 226-234). (Year: 2014).*
Li et al., 2018, "Infrared and Visible Image Fusion using a Deep Learning Framework" (pp. 2705-2710). (Year: 2018).*
The World Intellectual Property Organization (WIPO) International Search Report for PCT/CN2020/098407 dated Oct. 10, 2020 6 Pages (including translation).
The European Patent Office (EPO) The Extended European Search Report for 20831068.0 dated Jul. 12, 2022 8 pages.
Dae Hoe Kim et al., "Latent feature representation with 3-D multi-view deep convolutional neural network for bilateral analysis in digital breast tomosynthesis," 2016 IEEE International Conference on Acoustics, Speech and Signal Processing (ICASSP), IEEE, Mar. 20, 2016 (Mar. 20, 2016), pp. 927-931. 5 pages.
Wenhuan Lu et al., "Breast Cancer Detection Based on Merging Four Modes MRI Using Convolutional Neural Networks," ICASSP 2019-2019 IEEE International Conference on Acoustics, Speech and Signal Processing (ICASSP), IEEE, May 12, 2019 (May 12, 2019), pp. 1035-1039. 5 pages.
Japan Patent Office (JPO)The Office Action For JP Application No. 2021-548679 dated Sep. 13, 2022 9 Pages (Translation Included).
Japan Patent Office (JPO) Notification of reasons for refusal No. 2021-548679 dated Dec. 23, 2022 7 Pages (Translation Included).
Korean Intellectual Property Office (KIPO) Request for the Submission of an Opinion for 520050388561 dated May 22, 2023 12 Pages (including translation).

* cited by examiner

|  | Shared parameter | Image feature | |
|---|---|---|---|
| Left-cc | GoogleNet | | An image on a left side belongs to a health category |
| Left-mlo | GoogleNet | | An image on a left side belongs to a disease category |
| Right-cc | GoogleNet | | An image on a right side belongs to a health category |
| Right-mlo | GoogleNet | Fusion feature | An image on a right side belongs to a disease category |

IMAGE CLASSIFICATION METHOD, APPARATUS, AND DEVICE, STORAGE MEDIUM, AND MEDICAL ELECTRONIC DEVICE

RELATED APPLICATION(S)

This application is a continuation application of PCT Patent Application No. PCT/CN2020/098407 filed on Jun. 28, 2020, which claims priority to Chinese Patent Application No. 201910573560.9, entitled "IMAGE CLASSIFICATION METHOD, APPARATUS, AND DEVICE, STORAGE MEDIUM, AND MEDICAL ELECTRONIC DEVICE" and filed on Jun. 28, 2019, all of which are incorporated herein by reference in entirety.

FIELD OF THE TECHNOLOGY

The present disclosure relates to the field of image processing, and in particular, to an image classification method, apparatus, and device, a storage medium, a medical electronic device, and an image processing method.

BACKGROUND

Image classification refers to classifying input images into a group of predefined categories according to a specific classification rule. For example, object classification or scene classification may be performed on an input image according to semantic information included in the image. For example, an object included in an input image may be recognized, and classification is performed according to the recognized object. In another example, input images having similar content may be classified into the same category according to semantic information in the images.

SUMMARY

The present disclosure provides an image classification method, apparatus, and device, a storage medium, a medical electronic device, and an image processing method.

In one aspect, the present disclosure provides an image classification method performed by an electronic device. The method includes: receiving a target image and a reference image about the target image, the target image being a medical image; determining a first image feature of the target image and a second image feature of the reference image; fusing the first image feature and the second image feature to determine a to-be-classified image feature; and determining, by using the to-be-classified image feature, a probability that the target image belongs to a preset category, where determining the probability includes: obtaining a vector having a plurality of dimensions by using the to-be-classified image feature, elements in the vector respectively representing confidence scores that the target image and the reference image belong to the preset category; and determining, according to the confidence score that the target image belongs to the preset category, the probability that the target image belongs to the preset category.

In another aspect, the present disclosure provides an image classification apparatus. The apparatus includes a memory storing computer program instructions; and a processor coupled to the memory and configured to execute the computer program instructions and perform: receiving a target image and a reference image about the target image, the target image being a medical image; determining a first image feature of the target image and a second image feature of the reference image; fusing the first image feature and the second image feature to determine a to-be-classified image feature; and determining, by using the to-be-classified image feature, a probability that the target image belongs to a preset category, where determining the probability includes: obtaining a vector having a plurality of dimensions by using the to-be-classified image feature, elements in the vector respectively representing confidence scores that the target image and the reference image belong to the preset category; and determining, according to the confidence score that the target image belongs to the preset category, the probability that the target image belongs to the preset category.

In yet another aspect, the present disclosure provides an image classification apparatus. The apparatus includes: a receiving unit, configured to receive a target image and a reference image about the target image, the target image being a medical image; an image feature determining unit, configured to determine a first image feature of the target image and a second image feature of the reference image; a fusion unit, configured to fuse the first image feature and the second image feature to determine a to-be-classified image feature; and a classification result generating unit, configured to determine, by using the to-be-classified image feature, a probability that the target image belongs to a preset category, the classification result generating unit being configured to obtain a vector having a plurality of dimensions by using the to-be-classified image feature, elements in the vector respectively representing confidence scores that the target image and the reference image belong to the preset category; and determine, according to the confidence score that the target image belongs to the preset category, the probability that the target image belongs to the preset category.

In yet another aspect, the present disclosure provides a non-transitory computer-readable storage medium storing computer program instructions executable by at least one processor to perform: receiving a target image and a reference image about the target image, the target image being a medical image; determining a first image feature of the target image and a second image feature of the reference image; fusing the first image feature and the second image feature to determine a to-be-classified image feature; and determining, by using the to-be-classified image feature, a probability that the target image belongs to a preset category, where determining the probability includes: obtaining a vector having a plurality of dimensions by using the to-be-classified image feature, elements in the vector respectively representing confidence scores that the target image and the reference image belong to the preset category; and determining, according to the confidence score that the target image belongs to the preset category, the probability that the target image belongs to the preset category.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DESCRIPTION OF EMBODIMENTS

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Unless otherwise defined, the technical terms or scientific terms used herein are to have general meanings understood by a person of ordinary skill in the field of the present disclosure. The "first", the "second", and similar terms used in the present disclosure do not indicate any order, quantity or significance, but are used to only distinguish different components. Similarly, "include", "including", or similar terms mean that elements or items appearing before the term cover elements or items listed after the term and their equivalents, but do not exclude other elements or items. A similar term such as "connect" or "connection" is not limited to a physical or mechanical connection, but may include an electrical connection, whether direct or indirect. "Up", "down", "left", "right", and the like are merely used for indicating relative positional relationships. After absolute positions of described objects change, relative positional relationships may also change.

In an image classification method used in the related art, using a medical image as an example, only a target image of interest is usually processed. For example, for medical images of breasts of a human body, image classification processing is usually performed on only an image of a breast on a side of interest. However, individual medical images of different persons differ greatly in terms of physiological features such as tissue density and fat thickness, and consequently visual effects of medical images of breasts obtained for the different persons also differ greatly. Therefore, if only a medical image on a side of interest is processed, it is difficult to make a precise judgment. However, if comparison information of medical images of organs on both sides of the same person is considered during image classification, a more precise image classification result and disease screening result can be obtained.

Figure 1:
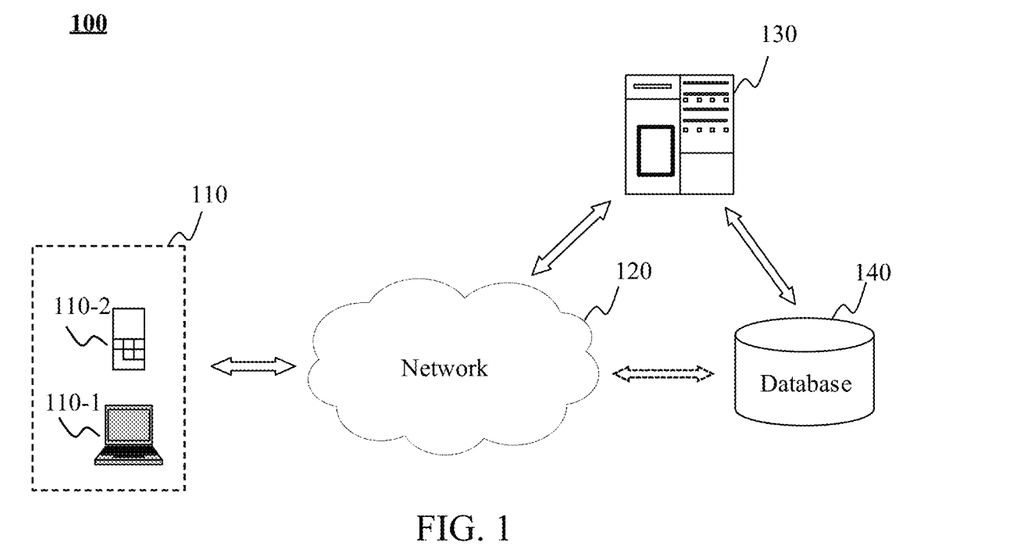
FIG. 1 is a schematic scene diagram of an image processing system according to one or more embodiments of the present disclosure.

FIG. 1 is an exemplary scene diagram of an image classification system according to the present disclosure. As shown in FIG. 1, the image classification system 100 may include a user terminal 110, a network 120, a server 130, and a database 140.

The user terminal 110 may be, for example, a computer 110-1 and a mobile phone 110-2 shown in FIG. 1. In certain embodiments, actually, the user terminal may be any other type of electronic device that can perform data processing, and may include, but not limited to, a desktop computer, a notebook computer, a tablet computer, a smartphone, a smart home device, a wearable device, an in-vehicle electronic device, and a monitoring device. The user terminal may alternatively be any equipment provided with an electronic device, for example, a vehicle or a robot.

The user terminal provided according to the present disclosure may be used for receiving a to-be-processed image, implementing image classification by using a method provided in the present disclosure, and then implementing disease screening. For example, the user terminal may capture a to-be-processed image through an image capture device (for example, a camera or a video camera) disposed on the user terminal. In another example, the user terminal may alternatively receive a to-be-processed image from an image capture device disposed independently. In still another example, the user terminal may alternatively receive a to-be-processed image from a server through a network. A to-be-processed image described herein may be an individual image or a frame in a video. When or in response to determining a to-be-processed image is a medical image, the user terminal may alternatively receive the to-be-processed image from a medical capture device. A medical image mentioned herein may be, for example, a medical image captured through a method such as Computed Tomography (CT), Magnetic Resonance Imaging (MRI), ultrasound, X-ray, or nuclide imaging (for example, Single-Photon Emission computed Tomography (SPECT) or Positron Emission Tomography (PET)), or may be an image displaying physiological information of a human body, for example, an electrocardiogram, an electroencephalogram, or an optical photograph.

In some embodiments, an image classification method provided in the present disclosure may be performed by using a processing unit of the user terminal. In some implementations, the user terminal may perform the image classification method by using an implementation program built in the user terminal. In some other implementations, the user terminal may perform, by invoking an implementation program stored outside the user terminal, the image classification method provided in the present disclosure.

In some other embodiments, the user terminal sends a received to-be-processed image to the server 130 through the network 120, and the server 130 performs the image classification method. In some implementations, the server 130 may perform the image classification method by using an implementation program built in the server. In some other implementations, the server 130 may perform the image classification method by invoking an implementation program stored outside the server.

The network 120 may be a single network or a combination of at least two different networks. For example, the network 120 may include, but not limited to, one of or a combination of more than one of a local area network, a wide area network, a public network, a private network, and the like.

The server 130 may be an individual server or a server cluster, and servers in the cluster are connected by a wired or wireless network. The server cluster may be centralized, for example, a data center, or distributed. The server 130 may be local or remote.

The database 140 may generally refer to a device having a storage function. The database 140 is in general used for storing various data used, generated, and outputted during operating of the user terminal 110 and the server 130. The database 140 may be local or remote. The database 140 may include various memories, for example, a random access memory (RAM) and a read-only memory (ROM). The storage devices mentioned above are only some listed examples, and storage devices that may be used by the system are not limited thereto.

The database 140 may connect to or communicate with the server 130 or a part thereof through the network 120, or directly connect to or communicate with the server 130, or a combination of the foregoing two manners is used.

In some embodiments, the database 140 may be an independent device. In some other embodiments, the database 140 may be alternatively integrated in at least one of the user terminal 110 and the server 130. For example, the database 140 may be disposed on the user terminal 110 or may be disposed on the server 130. In another example, the database 140 may alternatively be distributed, a part thereof is disposed on the user terminal 110, and another part is disposed on the server 130.

A process of an image processing method provided in the present disclosure is described below in detail.

Figure 2:
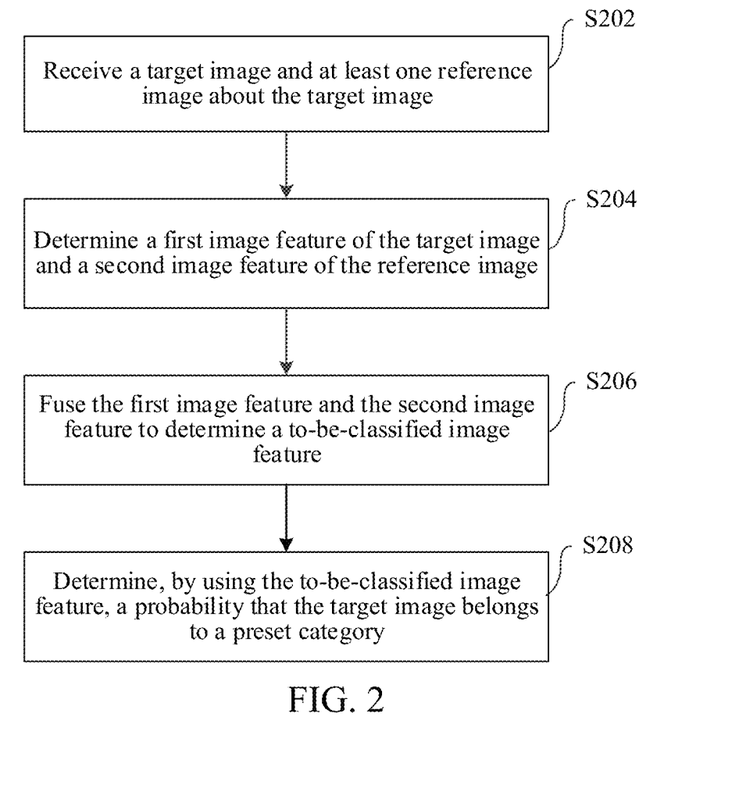
FIG. 2 is a schematic flowchart of an image classification method according to one or more embodiments of the present disclosure.

FIG. 2 is a schematic flowchart of an image processing method according to an embodiment of the present disclosure.

As shown in FIG. 2, in step S202, a target image and at least one reference image about the target image may be received. In some embodiments, the reference image may be an image in the same type as that of the target image. For example, the reference image may include another target object that is the same as a target object in the target image or that is in the same type as that of a target object in the target image.

In some embodiments, the target image may be a medical image. For example, when the target image is a medical image of an organ on a side of a human body, the reference image may be the same type of medical image of an organ on the other side of the same person. For example, organs mentioned herein may be any two or more organs existing in a human body, for example, breasts, eyes, lungs, or teeth.

In certain embodiments, without departing from the principle disclosed in the present disclosure, the target image mentioned herein may alternatively be any other type of image other than the medical image, provided that the reference image may include a target object in the same type as that of a target object in the target image. For example, the target image may be a face image. The reference image may be a face image captured at another time (for example, in a different background, at different illumination, or at a different age stage). In another example, the target image may be an image of any animal or plant other than a human being.

In some embodiments, the target image may include a plurality of images for the same target object.

In some implementations, the target image may include images of the target object that are obtained from at least two angles. For example, the target image may include a molybdenum target detection image of a breast of a human body photographed from a craniocaudal (CC) viewing angle and a molybdenum target detection image of the breast of the human body photographed from a mediolateral-oblique (MLO) viewing angle. In certain embodiments, when the target image includes another type of target object, a person skilled in the art may freely set an alternative or different manner of photographing the target object, to obtain another target image obtained from a different angle.

In some other implementations, the target image may alternatively include the target object obtained through at least two different devices. For example, the target image may include an image of a breast of a human body captured through an X-ray device and an image of the breast of the human body captured through an MRI device. In certain embodiments, when the target image includes another type of target object, a person skilled in the art may freely set an alternative or different manner of photographing the target object, to obtain another target image obtained through a different device. For example, target images including the target object may be alternatively obtained respectively through at least two cameras with different parameters.

When or in response to determining there are a plurality of target images, there may be a plurality of reference images respectively corresponding to all of the plurality of target images. Each reference image is obtained in the same manner or in a different manner as that of obtaining a corresponding target image.

In step S204, a first image feature of the target image and a second image feature of the reference image may be determined. For example, the first image feature of the target image and the second image feature of the reference image may be determined in the same manner or in a different manner.

In some embodiments, convolution processing may be performed, by using a first neural network including at least one convolutional layer, on the target image to obtain the first image feature. Further, convolution processing may be performed, by using the first neural network, on the reference image to obtain the second image feature. That is to say, the target image and the reference image may be processed by using the parameter shared neural network. The first image feature and the second image feature may each include a plurality of image features.

In some implementations, the first neural network may be any neural network that can obtain an image feature from an image. For example, the first neural network may be any network including at least one convolutional layer, for example, any one of an Inception series network (for example, Googlenet), a VGG series network, a Resnet series network, and the like or at least one part of any one of the foregoing networks.

In some embodiments, at least one of features such as a color feature, a texture feature, a shape feature, and a spatial relationship feature in the target image may be alternatively extracted as the first image feature. Further, a feature in the reference image may be extracted as the second image feature by using the same method.

In step S206, the first image feature and the second image feature may be fused to determine a to-be-classified image feature.

In some embodiments, the first image feature and the second image feature may be stitched, to determine the to-be-classified image feature.

In an implementation, the first image feature and the second image feature may each have a plurality of channels. For example, the first image feature may be a tensor in a size of H1*W1*C1, where H1 may be a size of the first image feature in a first direction (for example, a length direction), W1 may be a size of the first image feature in a second direction (for example, a width direction), H1 and W1 may be sizes with pixel quantities as units, and C1 may be a channel quantity of the first image feature. The second image feature may be a tensor in a size of H2*W2*C2, where H2 may be a size of the second image feature in a first direction (for example, a length direction), W2 may be a size of the second image feature in a second direction (for example, a width direction), H2 and W2 may be sizes with pixel quantities as units, and C2 may be a channel quantity of the second image feature. C1 and C2 are integers greater than 1.

The fusing the first image feature and the second image feature to determine a to-be-classified image feature may include: stitching the first image feature and the second image feature, to determine the to-be-classified image feature.

For example, the first image feature may have 1024 channels, the second image feature may also have 1024 channels, and a to-be-classified image feature having 2048 channels may be obtained by stitching the first image feature and the second image feature. The to-be-classified image feature having 2048 channels fuses with information about the first image feature and the second image feature, that is, fuses with image information of the target image and the reference image.

In some embodiments, all elements in corresponding locations in corresponding channels of the first image feature and the second image feature may be alternatively added, to determine the to-be-classified image feature fusing with the image information of the target image and the reference image.

In step S208, the probability that the target image belongs to the preset category may be determined by using the to-be-classified image feature obtained in step S206. For example, the to-be-classified image feature obtained after fusion is simultaneously used for predicting whether breasts on both left and right sides are positive in breast cancer.

In some embodiments, the to-be-classified image feature may be processed by using a first generally-connected network, to obtain the probability that the target image belongs to the preset category.

In certain particular embodiments, the term "generally-connected network" is interchangeable with the term "fully connected network."

For example, the first generally-connected network may be configured to cause the first generally-connected network to output a vector having a plurality of dimensions, and elements in the vector respectively represent confidence scores that the target image and the reference image belong to the preset category.

Taking a classification process for a medical image as an example, preset categories may include a health category and a disease category. In an implementation, the target image may be a medical image of a breast on a left side of a human body, and the reference image may be a medical image of a breast on a right side of the human body. The vector outputted by the first generally-connected network may be 4-dimensional. Elements in 4 dimensions of the vector respectively represent confidence scores that the medical image of the breast on the left side belongs to the health category and the disease category and confidence scores that the medical image of the breast on the right side belong to the health category and the disease category.

In certain embodiments, for different implementation scenes, a person skilled in the art may set, according to an actual implementation, a quantity of preset categories used for classification. For example, the preset category may be any predefined possible classification category such as an animal category, a plant category, or a scene category. The first generally-connected network may be configured according to a quantity of input images (that is, a total quantity of target images and reference images) and a quantity of preset categories, to output a vector having a predetermined quantity of dimensions. For example, when the quantity of input images is m, and the quantity of preset categories is n, the vector outputted by first generally-connected network may have $m^n$ dimensions.

In some embodiments, probabilities that the target image and the reference image belong to the preset category may be determined according to confidence scores for a plurality of dimensions outputted by the first generally-connected network.

For example, for two confidence scores that the breast on the left side respectively belongs to the health category and the disease category, the two confidence scores used for the breast on the left side may be normalized by using a softmax function, to obtain a probability that the medical image of the breast on the left side belongs to the health category and a probability that the medical image of the breast on the left side belongs to the disease category. Similarly, a probability that the medical image of the breast on the right side belongs to the health category and a probability that the medical image of the breast on the right side belongs to the disease category may be obtained by using the softmax function.

In some embodiments, when the probability that the target image belongs to the preset category is greater than a preset probability threshold (for example, 0.5), it may be considered that the target image belongs to the preset category.

Therefore, image classification for the target image may be implemented according to the image information of the reference image.

By using the foregoing image classification method provided in this embodiment of the present disclosure, the image information of the reference image and the target image may be fused during image classification, and the probability that the target image belongs to the preset category may be determined according to the image feature obtained by fusing the image information of the target image and the reference image, thereby more accurately classifying the target image. When or in response to determining the target image and the reference image are medical images, accuracy of disease screening is improved. For example, through the foregoing image classification method provided in this embodiment of the present disclosure, when comparison information of images of breasts on both sides is notably different because a breast cancer patient suffers from breast cancer, it may be highly probably determined that one side of this person is positive in breast cancer.

Figure 3A:
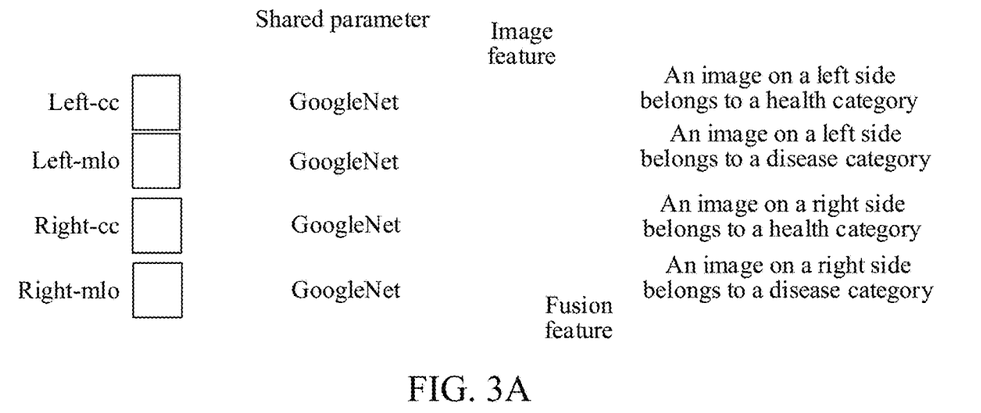
FIG. 3A shows a schematic process of an image classification method according to one or more embodiments of the present disclosure.
Figure 3B:
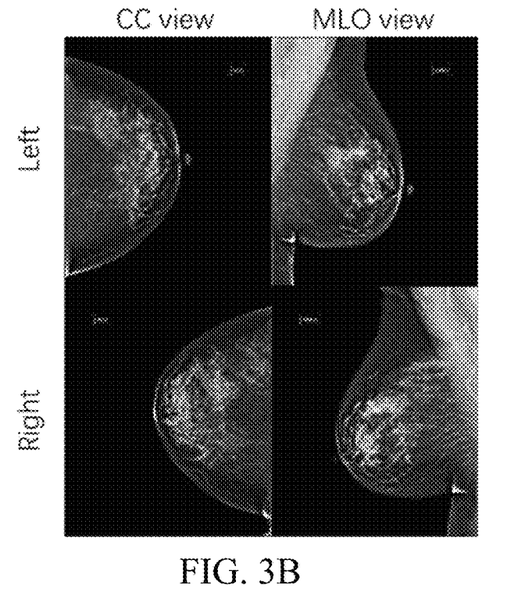
FIG. 3B shows a CC image and an MLO image of a left breast and a CC image and an MLO image of a right breast of a human body according to one or more embodiments of the present disclosure.

FIG. 3A shows a schematic process of an image classification method according to the present disclosure. As shown in FIG. 3A, input images may include a CC image and an MLO image of a left breast and a CC image and an MLO image of a right breast of a human body. FIG. 3B shows a CC image and an MLO image of a left breast and a CC image and an MLO image of a right breast of a human body.

As shown in FIG. 3A, the foregoing four input images may be respectively inputted to a parameter shared Googlenet network, thereby obtaining respective vectorized image features of the images. In some embodiments, a result outputted by any layer (for example, a rear layer such as a pool5/7×7_s1 layer in the Googlenet network) in the Googlenet network may be selected as a vectorized image feature of an image.

For example, a vectorized feature having 1024 dimensions may be generated for each input image by using the pool5/7×7_s1 layer in the Googlenet network. By fusing the four 1024-dimensional image features $f_{cc}^l$, $f_{mlo}^l$, $f_{cc}^R$, and $f_{mlo}^R$, one 4096-dimensional fusion feature $F=[f_{cc}^l, f_{mlo}^l, f_{cc}^R, f_{mlo}^R]$ may be obtained. The fusion feature is then processed through a generally-connected layer, and a vector having 4 dimensions may be obtained, where the dimensions respectively represent confidence scores $s+^l$, $s-^l$, $s+^R$, and $s-^R$ that the breast on the left side and the breast on the right side respectively belong to the health category and the disease category. $S+^l$ and $s-^l$ may be normalization by using the softmax function, to obtain probabilities $p+^l$ and $p-^l$ that the breast on the left side belongs to the health category and the disease category.

$$p_+^l=\exp(s_+^l)/(\exp(s_+^l)+\exp(s_-^l))$$

$$p_-^l=\exp(s_-^l)/(\exp(s_+^l)+\exp(s_-^l))$$

Similarly, $s+^R$ and $s-^R$ may be normalization by using the softmax function, to obtain probabilities $p+^R$ and $p-^R$ that the breast on the right side belongs to the health category and the disease category, where exp( ) is an exponential operation function.

When or in response to determining the medical image of the breast on the left side is used as the target image, and the medical image of the breast on the right side is used as the reference image, the probabilities that the target image and the reference image respectively belong to the health category and the disease category may be obtained by using the process shown in FIG. 3A. When a value of the probability $p+^l$ that the medical image of the breast on the left side belongs to the health category is greater than the preset probability threshold (for example, 0.5), it may be considered that the medical image of the breast on the left side belongs to the health category, and similarly, a category to which the medical image of the breast on the right side belongs may be determined.

The image classification method provided in this embodiment of the present disclosure may be used for recognizing whether a breast molybdenum target scan of a suspected breast cancer patient contains breast cancer. For example, multi-viewing-angle scans of the breast on both left and right sides may be simultaneously received based on a network structure used for comparing breasts on both left and right sides, feature extraction is individually performed on each scan of a breast on each side, then feature fusion is performed, and a feature obtained after fusion is simultaneously used for predicting whether the breasts on both left and right sides are positive in breast cancer.

When or in response to determining image features are extracted by using neural networks and a final classification result is obtained, to achieve an accurate classification effect for different types of input images, the used neural networks (for example, aforementioned first neural network and/or first generally-connected network) need to be trained by using corresponding types of training sets.

In some embodiments, the first neural network and the first generally-connected network may be trained in the following manner: For example, a first training set of the first neural network may be determined, where the first training set includes a plurality of training images. The plurality of training images are images in the same type as that of the target image. For example, taking a medical image as an example, when the first neural network and the first generally-connected network are used for breast image classification, the plurality of training images included in the first training set may be known samples of different breast images conforming to a preset type. For example, the first training set may include a first training image. A first reference training image used for the first training image may be determined according to the method shown in FIG. 2. For example, When or in response to determining the first training image is the medical image of the breast on the left side, the first reference training image may be the medical image of the breast on the right side.

With reference to the method shown in FIG. 2, convolution processing may be performed, by using the first neural network, on the first training image and the first reference training image respectively to obtain a first training image feature and a second training image feature. Further, a to-be-classified training image feature may be determined according to the first training image feature and the second training image feature. The to-be-classified training image feature fuses with the image information of the first training image and the first training the reference image. Further, the to-be-classified training image feature may be processed by using the first generally-connected network, to determine a probability that the first training image belongs to the preset category.

To train the first neural network and the first generally-connected network, parameters of the first neural network and the first generally-connected network may be adjusted, to minimize a loss between the probability that the first training image belongs to the preset category and an actual category to which the first training image belongs.

The loss between the probability that the first training image belongs to the preset category and the actual category to which the first training image belongs may be calculated by using a cross entropy loss function.

As described above, taking a medical image of a breast as an example, the first generally-connected network may output probabilities representing that the image of the breast on the left side belongs to the health category and the disease category and the image of the breast on the right side belongs to the health category and the disease category. The loss of the image of the breast on the left side may be calculated according to the following formula:

$$L_{left}=d\log(p_+^l)+(1-d)\log(p_-^l)$$

where $p_+^l$ is the probability that the image of the breast on the left side belongs to the health category, $p_-^l$ is the probability that the image of the breast on the left side belongs to the disease category, d is a labeled true value, d=0 when an actual category to which the image of the breast on the left side belongs is the health category, and d=1 when an actual category to which the image of the breast on the left side belongs is the disease category.

Similarly, the loss of the image of the breast on the right side may be calculated according to the following formula:

$$L_{right}=d\log(p_+^r)+(1-d)\log(p_-^r)$$

where $p_+^r$ is the probability that the image of the breast on the right side belongs to the health category, $p_-^r$ is the probability that the image of the breast on the right side belongs to the disease category, d is a labeled true value, d=0 when an actual category to which the image of the breast on the right side belongs is the health category, and d=1 when an actual category to which the image of the breast on the right side belongs is the disease category.

According to this embodiment of the present disclosure, the first neural network and the first generally-connected network are trained by using a plurality of images, in a known category, of breasts on both sides, and comparison information of the images of the breasts on the both sides may be learned during training. Therefore, even if individual breast scans of different persons differ greatly in aspects such as tissue density and fat thickness, the trained first neural network and first generally-connected network may still stably and precisely determine, based on the breast scans, whether there is breast cancer.

In certain embodiments, positive samples and negative samples of training data are in an unbalanced proportion. For example, taking a medical image as an example, in training images, samples belonging to the disease category are relatively small in quantity, while samples belonging to the health category are relatively large in quantity. Therefore, a problem of unbalanced samples exists.

To resolve the foregoing problem of unbalanced samples, at least two network models with different parameters (for example, network models including the first neural network and the first generally-connected network) may be trained through sample sets including positive samples and negative samples in different proportions and by using the same method, to process input images, and probabilities that the input images belong to the preset category are determined according to output results of different networks. The input images include the target image and the reference image of the target image. For example, the first neural network is obtained by performing training by using a first training set, the second neural network is obtained by performing training by using a second training set, and proportions of positive samples to negative samples in training images included in the first training set and the second training set are different.

Figure 4:
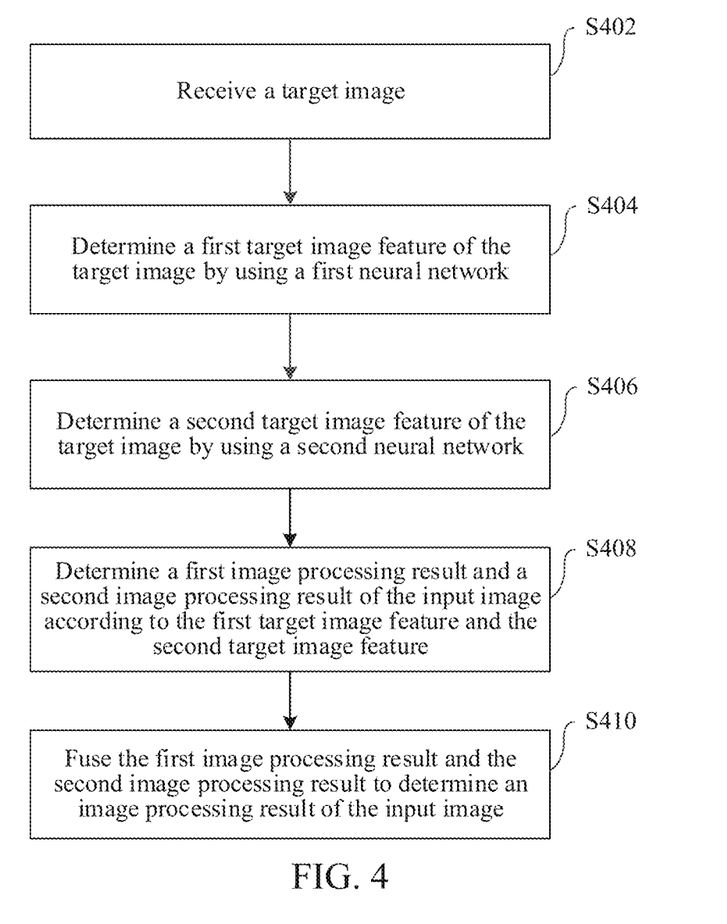
FIG. 4 is a schematic flowchart of an image processing method according to one or more embodiments of the present disclosure.

FIG. 4 is a flowchart of an image processing method according to an embodiment of the present disclosure. As shown in FIG. 4, in step S402, a target image may be received. The target image may be a medical image or any other type of image.

In step S404, a first target image feature of the target image may be determined by using a first neural network. For example, convolution processing may be performed, by using the first neural network including at least one convolutional layer, on the target image to obtain the first target image feature. The first target image feature may include a plurality of image features.

In step S406, a second target image feature of the target image may be determined by using a second neural network. For example, convolution processing may be performed, by using the second neural network including at least one convolutional layer, on the target image to obtain the second target image feature. The second target image feature may include a plurality of image features.

In some implementations, the first neural network and the second neural network may be any neural network that can obtain an image feature from an image. For example, the first neural network may be any network including at least one convolutional layer, for example, any one of an Inception series network (for example, Googlenet), a VGG series network, a Resnet series network, and the like or at least one part of any one of the foregoing networks.

In some embodiments, the first neural network and the second neural network being different networks trained by using the same training method, the first neural network being obtained by performing training by using a first training set, the second neural network being obtained by performing training by using a second training set, and proportions of positive samples to negative samples in training images included in the first training set and the second training set being different.

In step S408, a first image processing result and a second image processing result of the target image may be determined according to the first target image feature and the second target image feature.

In certain embodiments, because the first neural network and the second neural network are different networks obtained by using the same training method, the first image processing result and the second image processing result are in the same type. For example, the first image processing result and the second image processing result may be at least one of an image classification result, an image segmentation result, and a target detection result. This depends on specific manners and training sets used by a person skilled in the art for training neural networks.

In step S410, the first image processing result and the second image processing result are fused, to determine an image processing result of the target image. Corresponding to types of the first image processing result and the second image processing result, the image processing result includes at least one of an image classification result, an image segmentation result, and a target detection result.

A proportion of positive samples to negative samples that causes a positive sample loss and a negative sample loss of a network to be close may be determined through an experiment. For example, by calculating a loss function of all positive samples and a loss function of all negative samples in a training set, a positive sample loss and a negative sample loss of a network trained by the training set may be determined. Certain embodiments of the present disclosure are described below by using an example in which a positive sample loss and a negative sample loss of a network are close when a proportion of positive samples to negative samples is 1:2.

In an implementation, a first training set in which a proportion of positive samples to negative samples is 1:1 and a second training set in which a proportion of positive samples to negative samples is 1:3 may be determined through sampling.

According to certain embodiments of the present disclosure, when a proportion of positive samples to negative samples is 1:2, a positive sample loss and a negative sample loss of a network are close. Therefore, when a proportion of positive samples to negative samples in a training set is changed, a proportion of a positive sample loss to a negative sample loss of a network generated through training may be also correspondingly changed. Therefore, because a proportion of positive samples in the first training set in which a proportion of positive samples to negative samples is 1:1 is increased, a positive sample loss of a network trained by the first training set is less than a negative sample loss. Similarly, because a proportion of negative samples in the second training set in which a proportion of positive samples to negative samples is 1:3 is increased, a positive sample loss of a network trained by the second training set is greater than a negative sample loss.

The network trained by the first training set has a better classification effect on the positive samples, and the network trained by the second training set has a better classification effect on the negative sample. For example, when image classification is performed by using the network trained by the first training set, for an input image of positive samples, a probability that is outputted by the network trained by the first training set and that represents that the input image belongs to the preset category is closer to 0 or 1, that is, it is easier to recognize whether the input image belongs to the preset category. Correspondingly, because the network trained by the first training set has a poorer classification effect on the negative samples, for an input image of the negative samples, the network trained by the first training set outputs a probability closer to 0.5, that is, it is relatively uneasy to recognize a category to which the input image belongs. Based on the foregoing characteristics, a more precise prediction result can be obtained by fusing output results of the network trained by the first training set and the network trained by the second training set.

Similarly, a first training set in which a proportion of positive samples to negative samples is 1:1, a second training set in which a proportion of positive samples to negative samples is 1:3, and a third training set in which a proportion of positive samples to negative samples is 1:2 may be alternatively determined through sampling. The first neural network, the second neural network, and a third neural network may be respectively trained by using the first training set, the second training set, and the third training set. Taking the foregoing medical images of the breasts of the human body as an example, the first neural network, the second neural network, and the third neural network may be used to respectively output three output results $PA_+^l$, $PB_+^l$, and $PC_+^l$ that the medical image of the breast on the left side belongs to the health category, three output results $PA_-^l$, $PB_-^l$, and $PC_-^l$ that the medical image of the breast on the left side belongs to the disease category, three output results $PA_+^r$, $PB_+^r$, and $PC_+^r$ that the medical image of the breast on the right side belongs to the health category, and three output results $PA_-^r$, $PB_-^r$, and $PC_-^r$ that the medical image of the breast on the right side belongs to the disease category. Probabilities that the medical image of the breast on the left side and the medical image of the breast on the right side belong to the health category and the disease category may be determined by fusing (for example, performing weighted averaging on) the foregoing three results outputted by the networks obtained by using different training sets. For example, the probabilities that the medical image of the breast on the left side and the medical image of the breast on the right side belong to the health category and the disease category may be determined through the following formulas.

$$P_+^l = (PA_+^l + PB_+^l + PC_+^l)/3$$

$$P_-^l = (PA_-^l + PB_-^l + PC_-^l)/3$$

$$P_+^r = (PA_+^r + PB_+^r + PC_+^r)/3$$

$$P_-^A = (PA_-^r + PB_-^r + PC_-^r)/3$$

where $P_+^l$ is the probability that the medical image of the breast on the left side belongs to the health category, $P_-^l$ is the probability that the medical image of the breast on the left side belongs to the disease category, $P_+^r$ is the probability that the medical image of the breast on the right side belongs to the health category, and $P_-^r$ is the probability that the medical image of the breast on the right side belongs to the disease category.

Similarly, the first target the reference image feature and the second target the reference image feature of the reference image may be obtained through steps similar to steps S402 to S410.

Returning to refer to FIG. 2, in step S204, in some embodiments, the first image feature includes a first target image feature and a second target image feature. The first target image feature is obtained by performing convolution processing on the target image by using a first neural network including at least one convolutional layer, and the second target image feature is obtained by performing convolution processing on the target image by using a second neural network.

The second image feature includes a first target reference image feature and a second target reference image feature, where the first target reference image feature is obtained by performing convolution processing on the reference image by using the first neural network including the at least one convolutional layer, and the second target reference image feature is obtained by performing convolution processing on the reference image by using the second neural network.

The first neural network and the second neural network are different networks trained by using the same training method, the first neural network is obtained by performing training by using the foregoing first training set, and the second neural network is obtained by performing training by using the foregoing second training set. As described above, the proportions of positive samples to negative samples in training images included in the first training set and the second training set are different. Therefore, the first neural network and the second neural network have different parameters, and therefore also have different output results.

In step S206, the to-be-classified image feature includes a first to-be-classified image feature and a second to-be-classified image feature. For example, the first to-be-classified image feature may be determined by stitching the first target image feature and the first target reference image feature, and the second to-be-classified image feature may be determined by stitching the second target image feature and the second target reference image feature.

In step S208, the first to-be-classified image feature may be processed by using a first generally-connected network, to obtain a first probability that the target image belongs to the preset category. The second to-be-classified image feature may be processed by using a second generally-connected network, to obtain a second probability that the target image belongs to the preset category. By fusing the first probability and the second probability, the probability that the target image belongs to the preset category may be determined. For example, the probability that the target image belongs to the preset category may be determined according to a weighted average value of the first probability and the second probability, where the first generally-connected network and the second generally-connected network are different networks trained by using the same training method, where the first generally-connected network is obtained by performing training by using the first training set, the second generally-connected network is obtained by performing training by using the second training set, and the proportions of the positive samples to the negative samples in the training images included in the first training set and the second training set are different.

Although certain embodiments of the present disclosure are explained by using only two or three different training sets as an example in the present disclosure, this embodiment of the present disclosure is not limited thereto. A person skilled in the art may select more different training sets according to an actual implementation, and obtain more network models used for performing image classification.

By using the foregoing image classification method that is implemented by network models obtained based on different training sets and that is provided in the present disclosure, the problem of an unbalanced proportion of training data in the related art can be overcome, thereby improving accuracy of image classification and accuracy of disease screening.

Figure 5:
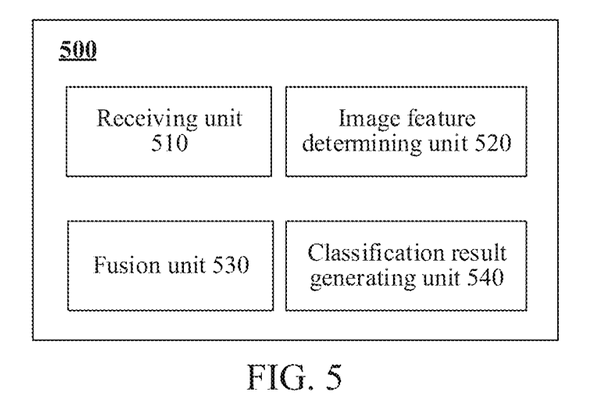
FIG. 5 is a schematic block diagram of an image classification apparatus according to one or more embodiments of the present disclosure.

FIG. 5 is a schematic block diagram of an image classification apparatus according to an embodiment of the present disclosure. As shown in FIG. 5, the image classification apparatus 500 may include a receiving unit 510, an image feature determining unit 520, a fusion unit 530, and a classification result generating unit 540.

The receiving unit 510 may be configured to receive a target image and at least one reference image about the target image. In some embodiments, the reference image may be an image in the same type as that of the target image. For example, the reference image may include another target object that is the same as a target object in the target image or that is in the same type as that of a target object in the target image.

The target image may be a medical image. For example, when the target image is a medical image of an organ on a side of a human body, the reference image may be the same type of medical image of an organ on the other side of the same person. For example, organs mentioned herein may be any two or more organs existing in a human body, for example, breasts, eyes, lungs, or teeth.

In certain embodiments, without departing from the principle disclosed in the present disclosure, the target image mentioned herein may alternatively be any other type of image other than the medical image, provided that the reference image may include a target object in the same type as that of a target object in the target image. For example, the target image may be a face image. The reference image may be a face image captured at another time (for example, in a different background, at different illumination, or at a different age stage). In another example, the target image may be an image of any animal or plant other than a human being.

In some embodiments, the target image may include a plurality of images for the same target object.

In some implementations, the target image may include images of the target object that are obtained from at least two angles. For example, the target image may include a molybdenum target detection image of a breast of a human body photographed from a craniocaudal (CC) viewing angle and a molybdenum target detection image of the breast of the human body photographed from a mediolateral-oblique (MLO) viewing angle. In certain embodiments, when the target image includes another type of target object, a person skilled in the art may freely set an alternative or different manner of photographing the target object, to obtain another target image obtained from a different angle.

In some other implementations, the target image may alternatively include the target object obtained through at least two different devices. For example, the target image may include an image of a breast of a human body captured through an X-ray device and an image of the breast of the human body captured through an MIll device. In certain embodiments, when the target image includes another type of target object, a person skilled in the art may freely set an alternative or different manner of photographing the target object, to obtain another target image obtained through a different device. For example, target images including the target object may be alternatively obtained respectively through at least two cameras with different parameters.

When or in response to determining there are a plurality of target images, there may be a plurality of reference images respectively corresponding to all of the plurality of target images. Each reference image is obtained in the same manner or in a different manner as that of obtaining a corresponding target image.

The image feature determining unit 520 may be configured to determine a first image feature of the target image and a second image feature of the reference image in the same manner or in a different manner. For example, the first image feature of the target image and the second image feature of the reference image may be determined in the same manner or in a different manner.

In some embodiments, convolution processing may be performed, by using a first neural network including at least one convolutional layer, on the target image to obtain the first image feature. Further, convolution processing may be performed, by using the first neural network, on the reference image to obtain the second image feature. That is to say, the target image and the reference image may be processed by using the parameter shared neural network. The first image feature and the second image feature may each include a plurality of image features.

In some implementations, the first neural network may be any neural network that can obtain an image feature from an image. For example, the first neural network may be any network including at least one convolutional layer, for example, any one of an Inception series network (for example, Googlenet), a VGG series network, a Resnet series network, and the like or at least one part of any one of the foregoing networks.

In some embodiments, at least one of features such as a color feature, a texture feature, a shape feature, and a spatial relationship feature in the target image may be alternatively extracted as the first image feature. Further, a feature in the reference image may be extracted as the second image feature by using the same method.

In some embodiments, the first image feature includes a first target image feature and a second target image feature. The first target image feature is obtained by performing convolution processing on the target image by using a first neural network including at least one convolutional layer, and the second target image feature is obtained by performing convolution processing on the target image by using a second neural network. The first target image feature and the second target image feature may each include a plurality of image features.

The second image feature includes a first target reference image feature and a second target reference image feature, where the first target reference image feature is obtained by performing convolution processing on the reference image by using the first neural network including the at least one convolutional layer, and the second target reference image feature is obtained by performing convolution processing on the reference image by using the second neural network.

The first neural network and the second neural network are different networks trained by using the same training method, the first neural network is obtained by performing training by using the foregoing first training set, and the second neural network is obtained by performing training by using the foregoing second training set.

The fusion unit 530 may be configured to fuse the first image feature and the second image feature to determine a to-be-classified image feature.

In some embodiments, the first image feature and the second image feature may be stitched, to determine the to-be-classified image feature.

The fusing the first image feature and the second image feature to determine a to-be-classified image feature may include: stitching the first image feature and the second image feature, to determine the to-be-classified image feature.

In some embodiments, the to-be-classified image feature includes a first to-be-classified image feature and a second to-be-classified image feature. For example, the first to-be-classified image feature may be determined by stitching the first target image feature and the first target reference image feature, and the second to-be-classified image feature may be determined by stitching the second target image feature and the second target reference image feature.

The classification result generating unit 540 may be configured to determine, by using the to-be-classified image feature generated by the fusion unit 530, a probability that the target image belongs to a preset category. In some embodiments, the to-be-classified image feature may be processed by using a first generally-connected network, to obtain the probability that the target image belongs to the preset category.

For example, the first generally-connected network may be configured to cause the first generally-connected network to output a vector having a plurality of dimensions, and elements in the vector respectively represent confidence scores that the target image and the reference image belong to the preset category.

In certain embodiments, for different implementation scenes, a person skilled in the art may set, according to an actual implementation, a quantity of preset categories used for classification.

In some embodiments, probabilities that the target image and the reference image belong to the preset category may be determined according to confidence scores for a plurality of dimensions outputted by the first generally-connected network.

For example, for two confidence scores that the breast on the left side respectively belongs to the health category and the disease category, the two confidence scores used for the breast on the left side may be normalized by using a softmax function, to obtain a probability that the medical image of the breast on the left side belongs to the health category and a probability that the medical image of the breast on the left side belongs to the disease category. Similarly, a probability that the medical image of the breast on the right side belongs to the health category and a probability that the medical image of the breast on the right side belongs to the disease category may be obtained by using the softmax function.

In some embodiments, when the probability that the target image belongs to the preset category is greater than a preset probability threshold (for example, 0.5), it may be considered that the target image belongs to the preset category.

In some embodiments, the classification result generating unit 540 may further process the first to-be-classified image feature by using a first generally-connected network, to obtain a first probability that the target image belongs to the preset category. The second to-be-classified image feature may be processed by using a second generally-connected network, to obtain a second probability that the target image belongs to the preset category. By fusing the first probability and the second probability, the probability that the target image belongs to the preset category may be determined. For example, the probability that the target image belongs to the preset category may be determined according to a weighted average value of the first probability and the second probability, where Therefore, image classification for the target image may be implemented according to the image information of the reference image.

By using the foregoing image classification apparatus provided in the present disclosure, the image information of the reference image and the target image may be fused during image classification, and the probability that the target image belongs to the preset category may be determined according to the image feature obtained by fusing the image information of the target image and the reference image, thereby more accurately classifying the target image. When or in response to determining the target image and the reference image are medical images, accuracy of disease screening is improved. Moreover, the problem of an unbalanced proportion of training data in the related art can be further overcome, thereby further improving accuracy of image classification and accuracy of disease screening.

Figure 6:
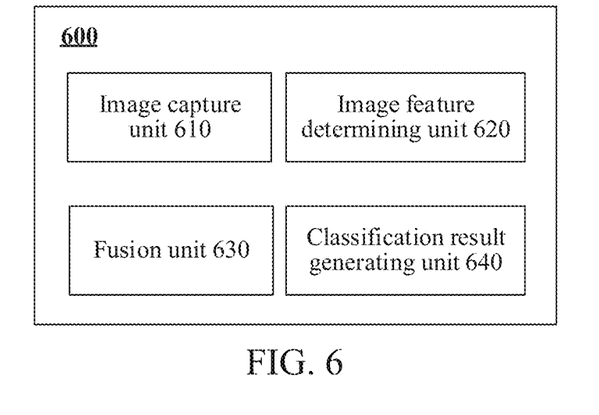
FIG. 6 is a schematic block diagram of a medical electronic device according to one or more embodiments of the present disclosure.

FIG. 6 is a schematic block diagram of a medical electronic device according to an embodiment of the present disclosure. As shown in FIG. 6, the medical electronic device 600 may include an image capture unit 610, an image feature determining unit 620, a fusion unit 630, and a classification result generating unit 640.

The image capture unit 610 may be configured to capture a target image and a reference image about the target image. A medical image mentioned herein may be, for example, a medical image captured through a method such as CT, MRI, ultrasound, X-ray, or nuclide imaging (for example, SPECT or PET), or may be an image displaying physiological information of a human body, for example, an electrocardiogram, an electroencephalogram, or an optical photograph.

The image feature determining unit 620, the fusion unit 630, and the classification result generating unit 640 may be implemented as the image feature determining unit 520, the fusion unit 530, and the classification result generating unit 540 shown in FIG. 5, and details are not described herein again.

In some implementations, the medical electronic device provided in the present disclosure may be any medical imaging device such as a CT, MRI, ultrasound, or X-ray instrument. The image capture unit 610 may be implemented as the imaging unit of the foregoing medical imaging device, and the image feature determining unit 620, the fusion unit 630, and the classification result generating unit 640 may be implemented through an internal processing unit (for example, a processor) of the medical imaging device.

Figure 7:
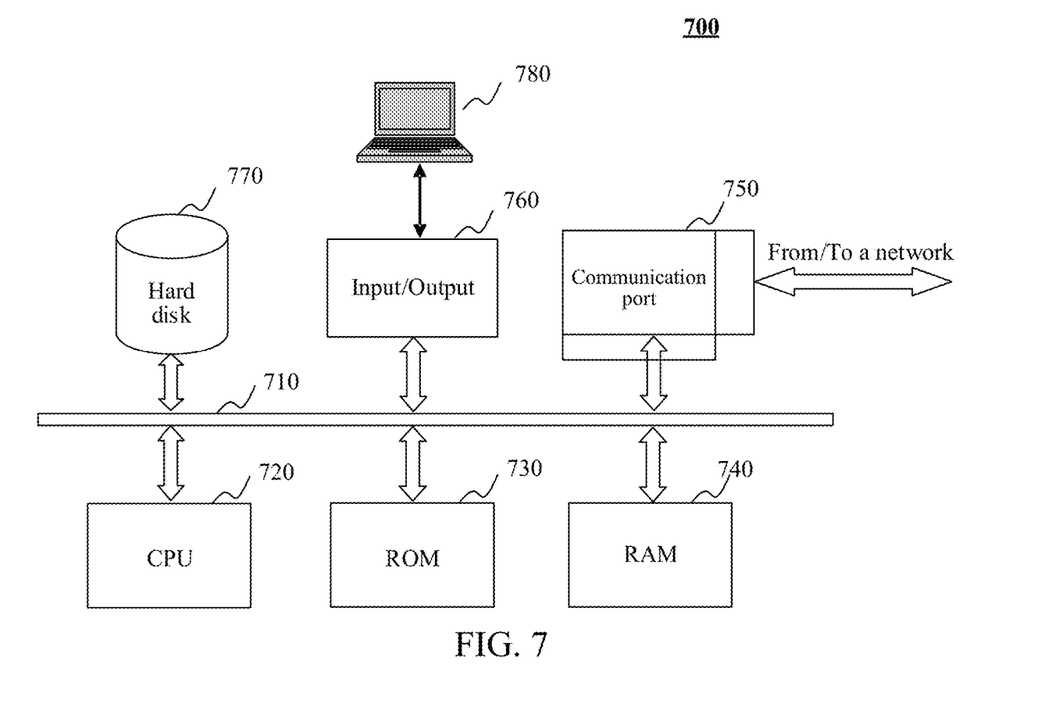
FIG. 7 shows a schematic architecture of a computing device according to one or more embodiments of the present disclosure.

In addition, the method or apparatus according to the embodiments of the present disclosure may alternatively be implemented by using an architecture of a computing device shown in FIG. 7. FIG. 7 shows an architecture of a computing device. As shown in FIG. 7, the computing device 700 may include a bus 710, one or at least two CPUs 720, a read-only memory (ROM) 730, a random access memory (RAM) 740, a communication port 750 connected to a network, an input/output component 760, a hard disk 770, and the like. A storage device, for example, the ROM 730 or the hard disk 770, in the computing device 700 may store various data or files used in processing and/or communication in the method for detecting a target in a video according to the present disclosure and program instructions executed by the CPU. The computing device 700 may further include a user interface 780. The architecture shown in FIG. 7 is only exemplary, and when different devices are implemented, one or at least two components in the computing device shown in FIG. 7 may be omitted according to an actual need.

The embodiments of the present disclosure may alternatively be implemented as a computer-readable storage medium. Computer-readable instructions are stored on the computer-readable storage medium according to an embodiment of the present disclosure. The computer-readable instructions, when executed by a processor, may perform the method according to the embodiments of the present disclosure described with reference to the foregoing accompanying drawings. The computer-readable storage medium includes, but is not limited to, a volatile memory and/or a non-volatile memory. For example, the volatile memory may include a RAM and/or a cache. For example, the non-volatile memory may include a ROM, a hard disk, or a flash memory.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person skilled in the art can understand that, content disclosed in the present disclosure may have various variations and improvements. For example, the devices or components described above may be implemented by using hardware, or may be implemented by using software, firmware, or a combination of some of or all of the software, the firmware, and the hardware.

In addition, as shown in the present disclosure and the claims, words such as "a/an", "one", and/or "the" do not necessarily refer to singular forms and may also include plural forms, unless the context expressly indicates an exception. In general, terms "comprise" and "include" merely indicate including clearly identified steps and elements. The steps and elements do not constitute an exclusive list. A method or a device may also include other steps or elements.

In addition, although the present disclosure makes various references to some units in the system according to the embodiments of the present disclosure, any quantity of different units may be used and run on a client and/or a server. The units are only illustrative, and different aspects of the system and method may use different units.

In addition, flowcharts are used in the present disclosure for illustrating operations performed by the system according to the embodiments of the present disclosure. In certain embodiments, the foregoing or following operations are not necessarily strictly performed according to an order. On the contrary, the operations may be performed in a reverse order or simultaneously. Meanwhile, other operations may be added to the processes. Alternatively, one or more operations may be deleted from the processes.

Unless otherwise defined, all terms (including technical and scientific terms) used herein have the same meaning as commonly understood by one of ordinary skill in the art to which the present disclosure belongs. In certain embodiments, the terms such as those defined in commonly used dictionaries are to be interpreted as having meanings that are consistent with the meanings in the context of the related art, and are not to be interpreted in an idealized or extremely formalized sense, unless expressively so defined herein.

The above is description of the present disclosure, and is not to be considered as a limitation to the present disclosure. Although several exemplary embodiments of the present disclosure are described, a person skilled in the art may easily understand that, many changes can be made to the exemplary embodiments without departing from novel teaching and advantages of the present disclosure. Therefore, the changes are intended to be included within the scope of the present disclosure as defined by the claims. In certain embodiments, the above is description of the present disclosure, and is not to be considered to be limited by the disclosed specific embodiments, and modifications to the disclosed embodiments and other embodiments fall within the scope of the appended claims. The present disclosure is subject to the claims and equivalents thereof.

What is claimed is:

1. An image classification method, performed by an electronic device, the method comprising:
receiving a target image and a reference image about the target image, the target image being a medical image;
determining a first image feature of the target image and a second image feature of the reference image;
fusing the first image feature and the second image feature to determine a to-be-classified image feature; and
determining, by using the to-be-classified image feature, a probability that the target image belongs to a preset category, wherein determining the probability comprises:
obtaining a vector having a plurality of dimensions by using the to-be-classified image feature, elements in the vector respectively representing confidence scores that the target image and the reference image belong to the preset category; and
determining, according to the confidence score that the target image belongs to the preset category, the probability that the target image belongs to the preset category.

2. The image classification method according to claim 1, wherein determining the first image feature of the target image and the second image feature of the reference image comprises:
performing, by using a first neural network including at least one convolutional layer, convolution processing on the target image to obtain the first image feature; and
performing, by using the first neural network, convolution processing on the reference image to obtain the second image feature.

3. The image classification method according to claim 1, wherein fusing the first image feature and the second image feature to determine the to-be-classified image feature comprises:
stitching the first image feature and the second image feature, to determine the to-be-classified image feature.

4. The image classification method according to claim 2, wherein determining, by using the to-be-classified image feature, the probability that the target image belongs to the preset category comprises:
processing the to-be-classified image feature by using a first generally-connected network, to obtain the probability that the target image belongs to the preset category.

5. The image classification method according to claim 1, wherein:

the first image feature includes a first target image feature and a second target image feature, the first target image feature is obtained by performing convolution processing on the target image by using a first neural network including at least one convolutional layer, and the second target image feature is obtained by performing convolution processing on the target image by using a second neural network;

the second image feature includes a first target reference image feature and a second target reference image feature, wherein the first target reference image feature is obtained by performing convolution processing on the reference image by using the first neural network including the at least one convolutional layer, and the second target reference image feature is obtained by performing convolution processing on the reference image by using the second neural network; and the first neural network is obtained by performing training by using a first training set, the second neural network is obtained by performing training by using a second training set, and proportions of positive samples to negative samples in training images included in the first training set and the second training set are different.

6. The image classification method according to claim 5, wherein the to-be-classified image feature includes a first to-be-classified image feature and a second to-be-classified image feature, and wherein the first to-be-classified image feature is determined by stitching the first target image feature and the first target reference image feature, and the second to-be-classified image feature is determined by stitching the second target image feature and the second target reference image feature.

7. The image classification method according to claim 6, wherein determining, by using the to-be-classified image feature, the image classification result of the target image comprises:

processing the first to-be-classified image feature by using a first generally-connected network, to obtain a first probability that the target image belongs to the preset category;

processing the second to-be-classified image feature by using a second generally-connected network, to obtain a second probability that the target image belongs to the preset category; and determining, according to a weighted average value of the first probability and the second probability, the probability that the target image belongs to the preset category, wherein the first generally-connected network is obtained by performing training by using the first training set, the second generally-connected network is obtained by performing training by using the second training set, and the proportions of the positive samples to the negative samples in the training images included in the first training set and the second training set are different.

8. The image classification method according to claim 4, wherein the first neural network and the first generally-connected network are trained by:

determining the first training set of the first neural network, wherein the first training set includes a first training image;

determining a first reference training image of the first training image;

performing, by using the first neural network, convolution processing on the first training image and the first reference training image respectively to obtain a first training image feature and a second training image feature;

determining a to-be-classified training image feature according to the first training image feature and the second training image feature;

processing, by using the first generally-connected network, the to-be-classified training image feature to determine a probability that the first training image belongs to the preset category; and adjusting parameters of the first neural network and the first generally-connected network to minimize a loss between the probability that the first training image belongs to the preset category and an actual category to which the first training image belongs.

9. An image classification apparatus, comprising: a memory storing computer program instructions; and a processor coupled to the memory and configured to execute the computer program instructions and perform:

receiving a target image and a reference image about the target image, the target image being a medical image;

determining a first image feature of the target image and a second image feature of the reference image;

fusing the first image feature and the second image feature to determine a to-be-classified image feature; and determining, by using the to-be-classified image feature, a probability that the target image belongs to a preset category, wherein determining the probability comprises:

obtaining a vector having a plurality of dimensions by using the to-be-classified image feature, elements in the vector respectively representing confidence scores that the target image and the reference image belong to the preset category; and determining, according to the confidence score that the target image belongs to the preset category, the probability that the target image belongs to the preset category.

10. The image classification apparatus according to claim 9, wherein the processor is further configured to execute the computer program instructions and perform:

performing, by using a first neural network including at least one convolutional layer, convolution processing on the target image to obtain the first image feature; and performing, by using the first neural network, convolution processing on the reference image to obtain the second image feature.

11. The image classification apparatus according to claim 9, wherein the processor is further configured to execute the computer program instructions and perform:

stitching the first image feature and the second image feature, to determine the to-be-classified image feature.

12. The image classification apparatus according to claim 10, wherein the processor is further configured to execute the computer program instructions and perform:

processing the to-be-classified image feature by using a first generally-connected network, to obtain the probability that the target image belongs to the preset category.

13. The image classification apparatus according to claim 9, wherein:

the first image feature includes a first target image feature and a second target image feature, the first target image feature is obtained by performing convolution processing on the target image by using a first neural network including at least one convolutional layer, and the second target image feature is obtained by performing convolution processing on the target image by using a second neural network;

the second image feature includes a first target reference image feature and a second target reference image feature, wherein the first target reference image feature is obtained by performing convolution processing on the reference image by using the first neural network including the at least one convolutional layer, and the second target reference image feature is obtained by performing convolution processing on the reference image by using the second neural network; and the first neural network is obtained by performing training by using a first training set, the second neural network is obtained by performing training by using a second training set, and proportions of positive samples to negative samples in training images included in the first training set and the second training set are different.

14. The image classification apparatus according to claim 9, wherein the to-be-classified image feature includes a first to-be-classified image feature and a second to-be-classified image feature, and wherein the first to-be-classified image feature is determined by stitching the first target image feature and the first target reference image feature, and the second to-be-classified image feature is determined by stitching the second target image feature and the second target reference image feature.

15. The image classification apparatus according to claim 14, wherein the processor is further configured to execute the computer program instructions and perform:

processing the first to-be-classified image feature by using a first generally-connected network, to obtain a first probability that the target image belongs to the preset category;

processing the second to-be-classified image feature by using a second generally-connected network, to obtain a second probability that the target image belongs to the preset category; and determining, according to a weighted average value of the first probability and the second probability, the probability that the target image belongs to the preset category, wherein the first generally-connected network is obtained by performing training by using the first training set, the second generally-connected network is obtained by performing training by using the second training set, and the proportions of the positive samples to the negative samples in the training images included in the first training set and the second training set are different.

16. The image classification apparatus according to claim 12, wherein the first neural network and the first generally-connected network are trained by:

determining the first training set of the first neural network, wherein the first training set includes a first training image;

determining a first reference training image of the first training image;

performing, by using the first neural network, convolution processing on the first training image and the first reference training image respectively to obtain a first training image feature and a second training image feature;

determining a to-be-classified training image feature according to the first training image feature and the second training image feature;

processing, by using the first generally-connected network, the to-be-classified training image feature to determine a probability that the first training image belongs to the preset category; and adjusting parameters of the first neural network and the first generally-connected network to minimize a loss between the probability that the first training image belongs to the preset category and an actual category to which the first training image belongs.

17. A non-transitory computer-readable storage medium storing computer program instructions executable by at least one processor to perform:

receiving a target image and a reference image about the target image, the target image being a medical image;

determining a first image feature of the target image and a second image feature of the reference image;

fusing the first image feature and the second image feature to determine a to-be-classified image feature; and determining, by using the to-be-classified image feature, a probability that the target image belongs to a preset category, wherein determining the probability comprises:

obtaining a vector having a plurality of dimensions by using the to-be-classified image feature, elements in the vector respectively representing confidence scores that the target image and the reference image belong to the preset category; and determining, according to the confidence score that the target image belongs to the preset category, the probability that the target image belongs to the preset category.

18. The non-transitory computer-readable storage medium according to claim 17, wherein the computer program instructions are executable by the at least one processor to further perform:

performing, by using a first neural network including at least one convolutional layer, convolution processing on the target image to obtain the first image feature; and performing, by using the first neural network, convolution processing on the reference image to obtain the second image feature.

19. The non-transitory computer-readable storage medium according to claim 17, wherein the computer program instructions are executable by the at least one processor to further perform:

stitching the first image feature and the second image feature, to determine the to-be-classified image feature.

20. The non-transitory computer-readable storage medium according to claim 18, wherein the computer program instructions are executable by the at least one processor to further perform:

processing the to-be-classified image feature by using a first generally-connected network, to obtain the probability that the target image belongs to the preset category.

* * * * *